Sept. 13, 1955 W. O. TAIPALE 2,717,411
SHOPPING BAG HANDLE
Filed March 19, 1954
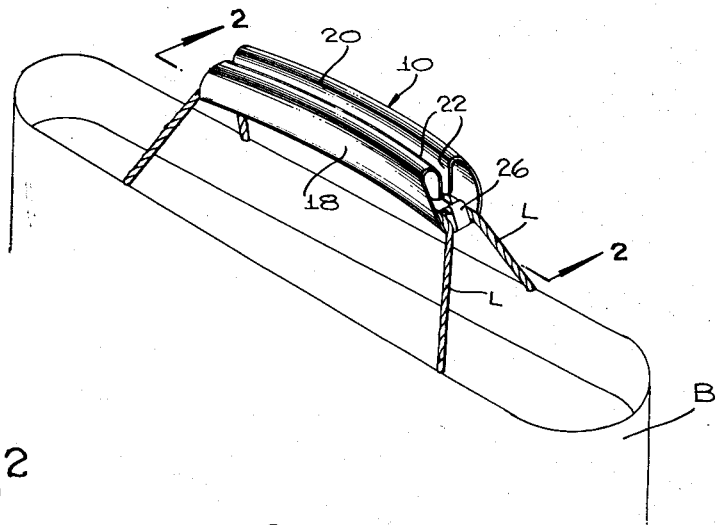
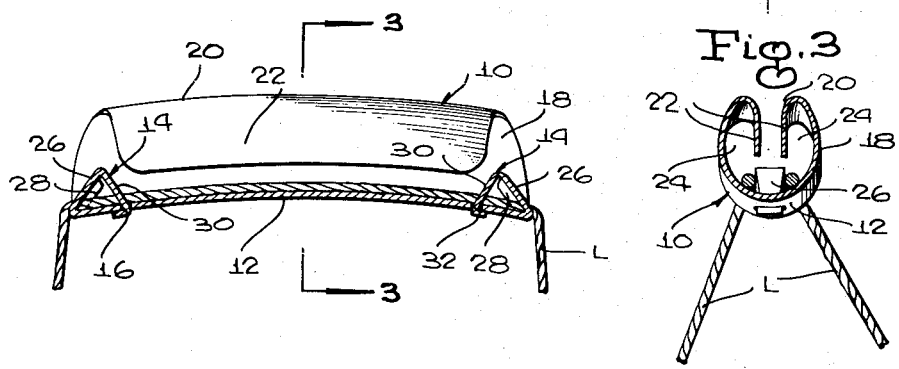
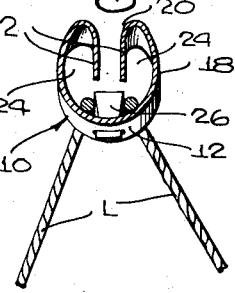
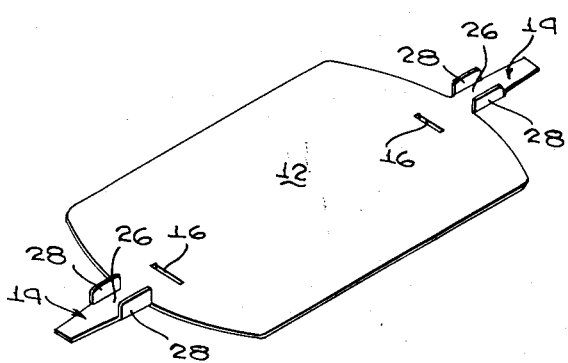
INVENTOR.
WAINO O. TAIPALE
BY
McMorrow, Berman & Davidson
ATTORNEYS United States Patent Office 2,717,411
Patented Sept. 13, 1955

2,717,411

SHOPPING BAG HANDLE

Waino O. Taipale, Rensselaer, N. Y.

Application March 19, 1954, Serial No. 417,311

1 Claim. (Cl. 16—114)

This invention relates to an improved shopping bag handle and has for its primary object to provide a novel handle of this kind which more effectively protects the hands of the user from injury and discomfort while carrying a shopping bag or the like.

Another object is to assure the retention of the handle loops of the shopping bag in the handle during such periods as the shopping bag is resting on a surface and while it is not suspended by the handle loops.

The above and other objects may be attained by employing this invention which embodies among its features a substantially tubular body having a slot extending longitudinally therethrough, flanges carried by the body and extending thereinto adjacent opposite sides of the slot to define with the body tubular chambers between the flanges and the sides of the body, and spreaders carried by the body and extending thereinto from the side thereof remote from the slot and adjacent opposite ends of the body for engaging the handle loops of a shopping bag and causing them to lie against the tubular body in registration with the chambers.

Other features include flanges carried by the spreaders and extending inwardly and outwardly from opposite sides thereof for engaging the handle loops and presenting smooth surfaces against which the handle loops are engaged while the shopping bag is suspended therefrom.

In the drawings:

Figure 1 is a perspective view of the shopping bag handle in use;

Figure 2 is a longitudinal sectional view taken substantially on the line 2—2 of Figure 1;

Figure 3 is a transverse sectional view taken substantially on the line 3—3 of Figure 2; and Figure 4 is a perspective view of the blank from which the handle is formed.

Referring to the drawings in detail, a shopping bag B is equipped with conventional handle loops L by which the bag may be suspended in the hands of the user during its transportation. As the contents of the bag is increased, the weight supported by the handle loops L becomes materially increased and frequently to a point where the carrier of the bag suffers considerable discomfort because of the tendency of the handle loops to cut into the flesh of the fingers supporting the bag.

In order to obviate the above condition, I have provided the illustrated handle, designated generally 10 which comprises a body 12 of sheet metal carrying on its opposite ends tabs or extensions designated generally 14, and adjacent opposite ends transversely extending slots 16.

The body 12 which is generally rectangular in plan, is rolled transversely to define a substantially tubular body 18 which is preferably curved longitudinally, as illustrated in Figure 2, to define a concavo-convex structure having a slot 20. Carried by the body 18 adjacent opposite sides of the slot 20 are inwardly extending flanges 22 which define with the body 18 chambers 24 on opposite sides of the slot 20.

As illustrated in Figure 2, the tongues 14 or extensions are bent upwardly and inwardly adjacent opposite ends of the body 12 to define spreaders 26 which have a width which exceeds the space between the flanges 22 and the slot 20 so as to cause the handle loops L of the shopping bag to be spread when engaged in the body 12 so as to lie in registration with the chambers 24. Suitable flanges 28 are carried by the spreaders 26 and extend inwardly and downwardly therefrom adjacent opposite sides thereof for providing smooth surfaces against which the handle loops L are engaged. Carried by and extending downwardly and inwardly from the spreaders 26 are braces 30, the lower ends of which are extended through the slots 16 and crimped or bent as at 32 to anchor the inner ends of the spreaders 26 and hold them in spaced relation to the bottom of the tubular body 18.

In use, it will be evident that when it is desired to place the handle on the handle loops L of a conventional shopping bag, the loops are passed through the slot 20 and the space between the flanges 22 until they encounter the spreaders 26 at which time the handle loops are forced apart adjacent opposite ends of the handle so as to lie in registration with the chambers 24. With the handle thus placed on the shopping bag, it is obvious that the fingers and hands of the user will be protected from contact with the handle loops L of the shopping bag B and that when the shopping bag is placed on a surface and the handle 10 released, the handle loops L will be directed into the chambers 24 rather than through the slot 20 so that when the handle is again grasped and the shopping bag lifted, the handle loops will fall into proper position adjacent opposite sides of the spreaders 26 and no danger of the handle loops accidentally passing through the slot 20 will be experienced.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

In a shopping bag handle, an elongated tubular body having a sidewall including upper and lower sidewall portions, a longitudinal slot in the upper sidewall portion extending through the ends of the body, said slot having spaced edges extending therealong, flanges on said edges and extending into said body, said flanges being spaced from each other and having free edges spaced from said lower sidewall portion of the body, and spreaders on said lower sidewall portion said spreaders rising toward and being spaced from the free edges of the flanges and being wider than the aperture between said flanges, said spreaders being narrower than said body and spaced from portions of the body sidewall between said upper and lower sidewall portions, said spreaders being longitudinally spaced from each other and located at the opposite ends of said body, and comprising tabs on the opposite ends of the body and reaching into the body above said lower sidewall portion, said tabs terminating in brace portions engaging said lower sidewall portion at points spaced longitudinally inwardly from the opposite ends of the body.

References Cited in the file of this patent

UNITED STATES PATENTS

| 1,576,546 | Ransom | Mar. 16, 1926 |
| 1,678,005 | Hallerman | July 24, 1928 |
| 1,781,583 | Hodgson | Nov. 11, 1930 |
| 2,448,894 | Laus | Sept. 7, 1948 |